United States Patent
Song et al.

(10) Patent No.: US 11,968,473 B2
(45) Date of Patent: Apr. 23, 2024

(54) WIRELESS TRANSMISSION CONTROLLER DEVICE FOR HIGH-SPEED, LARGE-CAPACITY TRANSMISSION

(71) Applicant: GLS CO., LTD., Daejeon (KR)

(72) Inventors: Ki Dong Song, Daejeon (KR); Ki Chan Eun, Daejeon (KR)

(73) Assignee: GLS CO., LTD., Daejeon (KR)

( * ) Notice: Subject to any disclaimer, the term of this patent is extended or adjusted under 35 U.S.C. 154(b) by 232 days.

(21) Appl. No.: 17/456,524

(22) Filed: Nov. 24, 2021

(65) Prior Publication Data
US 2022/0174239 A1    Jun. 2, 2022

(30) Foreign Application Priority Data

Nov. 30, 2020  (KR) .................. 10-2020-0163915
Dec. 23, 2020  (KR) .................. 10-2020-0181826

(51) Int. Cl.
*H04N 7/04*    (2006.01)
*G06F 13/38*   (2006.01)
*H04N 7/01*    (2006.01)

(52) U.S. Cl.
CPC ............. *H04N 7/04* (2013.01); *G06F 13/387* (2013.01); *H04N 7/0105* (2013.01)

(58) Field of Classification Search
CPC .... H04N 7/04; H04N 7/0105; H04N 21/4363; G06F 13/387; G06F 2213/0042; G09G 5/006; G09G 2370/04; G09G 2370/16
See application file for complete search history.

(56) References Cited

U.S. PATENT DOCUMENTS

2005/0105498 A1*  5/2005  Hardacker .............. H04L 12/66
2019/0149876 A1*  5/2019  Nguyen ............. H04N 21/4331
2020/0351547 A1* 11/2020  Sivertsen .......... H04N 21/43637

FOREIGN PATENT DOCUMENTS

| KR | 10-0994777 B1     | 11/2010 |
| KR | 10-2017-0018282 A | 2/2017  |
| KR | 10-1970164 B1     | 4/2019  |
| KR | 10-2020-0112572 A | 10/2020 |

OTHER PUBLICATIONS

Written Decision on Registration dated Apr. 30, 2022 for related Korean Patent Application No. 10-2020-0181826.

* cited by examiner

*Primary Examiner* — Anthony Bantamoi
(74) *Attorney, Agent, or Firm* — Sughrue Mion, PLLC

(57) ABSTRACT

A wireless transmission controller device is proposed. The device includes: a signal transmitter configured to receive an image signal input from a USB Type-C or a DP port, which are connected to an image storage device, convert the received image signal into a form of a high-speed serial signal, and wirelessly transmits the converted image signal to a signal receiver by ultra-high frequency communication; and the signal receiver configured to receive a high-speed serial signal from the signal transmitter, undergo a conversion process, and transmit the image signal to an image display device such as a monitor or a smartphone connected to the DP port, wherein, through making the USB Type-C or the Display Port to be wireless, high-speed wireless transmission in real time for a video is possible without a wired cable connection.

6 Claims, 6 Drawing Sheets

WIRELESS TRANSMISSION CONTROLLER DEVICE FOR HIGH-SPEED, LARGE-CAPACITY TRANSMISSION

CROSS REFERENCE TO RELATED APPLICATION

The present application claims priority to Korean Patent Application No. 10-2020-0181826, filed Dec. 23, 2020 and Korean Patent Application No. 10-2020-0163915 filed Nov. 30, 2020, the entire contents of which are incorporated herein for all purposes by this reference.

BACKGROUND OF THE INVENTION

Field of the Invention

The present disclosure relates to a controller device and, more particularly, to a wireless transmission controller device for high-speed, large-capacity transmission.

Description of the Related Art

Currently, USB Type-C is a next-generation interface that is expected to replace USB-A/B, USB-Micro-B, Display Port (DP), and Thunderbolt, and is being adopted as an integrated interface for external data and image transmission of PCs, notebooks, and smartphones.

In addition to data communication of USB 3.1, USB Type-C supports high-speed video communication through the display port together in the same interface, so as to unify what USB for data communication, Display Port for monitor connection, and HDMI adapter and cable for TV connection are respectively required conventionally, thereby greatly improving user convenience.

Meanwhile, millimeter wave (mm wave), which has recently been spotlighted in short-distance communication, has an Extremely High Frequency (EHF), and is a radio wave having a wavelength of 1 to 10 mm and a frequency of 30 to 300 GHz.

The main characteristics of millimeter wave are as follows.

Since the frequency of millimeter wave is high, broadband transmission is possible, and as the wavelength is short, miniaturization and weight reduction of an antenna and transceiver device may be realized, and a frequency reuse rate is high.

However, millimeter wave is not suitable for long-distance communication due to straightness thereof, and as a lot of signal attenuation thereof occurs due to atmospheric factors, the millimeter wave is greatly affected by geographic climate and seasons, so the millimeter wave is only suitable for configuring short-distance communication and small communication devices for high-speed, large-capacity transmission.

In particular, a usage scenario for which 60 GHz Wireless Personal Area Network (WPAN) communication is targeting is to provide high-speed data transmission on the basis of close proximity, and may be roughly distinguished from Near Field Communication (NFC) technology, which stipulates communication at a distance of less than 10 cm, but may have an unequalled degree of comparative advantage in transmission speed.

Therefore, there is a need for research on a wireless controller device capable of wirelessly transmitting high-speed, large-capacity video in real time without a wired cable connection, by making USB Type-C or Display Port to be wireless and using ultra-high frequency communication.

SUMMARY OF THE INVENTION

An objective of the present disclosure is to provide a wireless transmission controller device capable of transmitting high-speed video in real time, through wireless communication by using high-speed frequency, without a wired cable connection, by means of making USB Type-C or Display Port to be wireless.

According to an exemplary embodiment of the present disclosure, a wireless transmission controller device includes: a signal transmitter configured to receive an image signal input from a USB Type-C or a DP port, which are connected to an image storage device, convert the received image signal into a form of a high-speed serial signal, and wirelessly transmits the converted image signal to a signal receiver by ultra-high frequency communication; and the signal receiver configured to receive the high-speed serial signal from the signal transmitter, undergo a conversion process, and transmit the image signal to an image display device such as a monitor or a smartphone connected to the DP port.

The signal transmitter and the signal receiver may be manufactured in a form of a communication chip to be respectively modularized and designed for the image storage device and the image display device, or may be manufactured in a form of a dongle or a connector, which have an input/output terminal, to be respectively detachable to the image storage device and the image display device.

The signal transmitter may further include: a first image controller configured to receive the image signal for each of four lines through the image storage device, and the USB Type-C or the DP port, and output a signal corresponding to each line in a stream form; a first converter configured to serialize the image signal input from each of the four lines to a single line; a data composition part configured to read data stored in the first converter, compose a data frame by applying a following transmission protocol, and then transmit the data to a wireless transmission part; and the wireless transmission part configured to convert stream data input from the data composition part into the high-speed serial signal, and wirelessly transmit the high-speed serial signal to the signal receiver by the ultra-high frequency communication.

The signal receiver may include: a wireless reception part configured to receive wireless signal data transmitted from the wireless transmission part through the ultra-high frequency communication; a data analysis part configured to apply the transmission protocol to the data received from the wireless reception part to extract the image signal; a second converter configured to distribute the data for each of the four lines in order to transmit the image signal restored by the data analysis part to a second image controller; and the second image controller configured to transmit the restored image signal for each of the four lines to the image display device connected to the USB Type-C or the DP port, so as to display the image.

The ultra-high frequency communication may be performed by using an ultra-high frequency in a band of 30 to 300 GHz.

Since the wireless controller device of the present disclosure enables making USB Type-C and Display Port to be wireless, high-speed wireless transmission for video in real time is possible without a wired cable connection, and also high-speed wireless transmission of images including video in real time is possible from a user's smartphone to a UHD class large monitor.

In addition, an RF wireless transmission rate has a high-speed transmission rate within a predetermined range of an RF transceiver in opposite directions, and not only images having maximum resolution of FHD and QHD, but also images having maximum resolution of UHD 4K may be transmitted without compression by using signals of USB Type-C and wireless DP.

In addition, when the wired communication of USB Type-C and Display Port is made into wireless communication, the wireless communication is allowed to be applied to USB Type-C, which will be adopted for all smartphones, notebooks, PCs, and display devices, so that wireless data communication is made possible between devices even when users do not have physical cables, whereby user convenience may be greatly expanded.

DETAILED DESCRIPTION OF THE INVENTION

Figure 1:
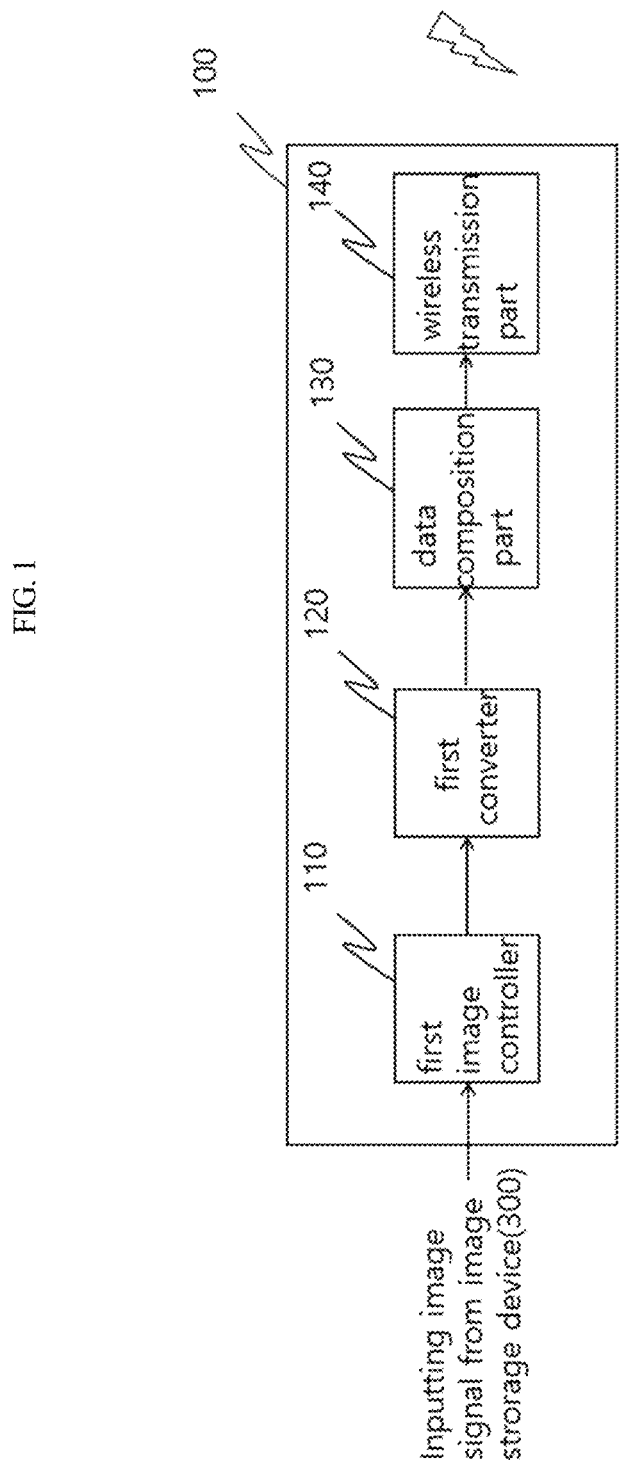
FIG. 1 is a view illustrating a detailed configuration of a signal transmitter.

Hereinafter, a specific exemplary embodiment of the present disclosure will be described in detail with reference to the drawings. However, the idea of the present disclosure is not limited to the presented exemplary embodiment, and through addition, change, deletion, and the like of other components within the scope of the same idea, those skilled in the art who understand the idea of the present disclosure may easily propose other exemplary embodiments included within the scope of the present disclosure or other disclosures that are retrogressive, but such other exemplary embodiments will also be included within the scope of the disclosure. In addition, components having the same function within the scope of the same idea shown in the drawings of each exemplary embodiment will be described using the same reference numerals.

Figure 2:
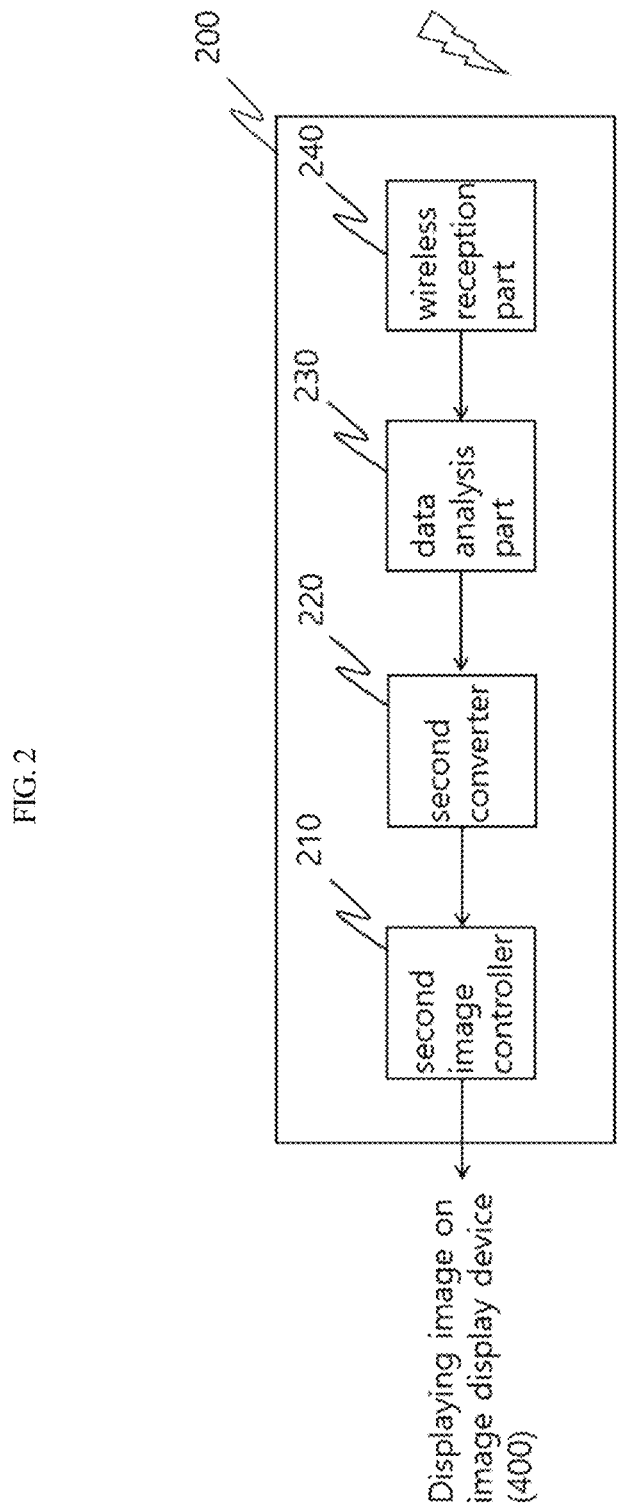
FIG. 2 is a view illustrating a detailed configuration of a signal receiver.
Figure 3:
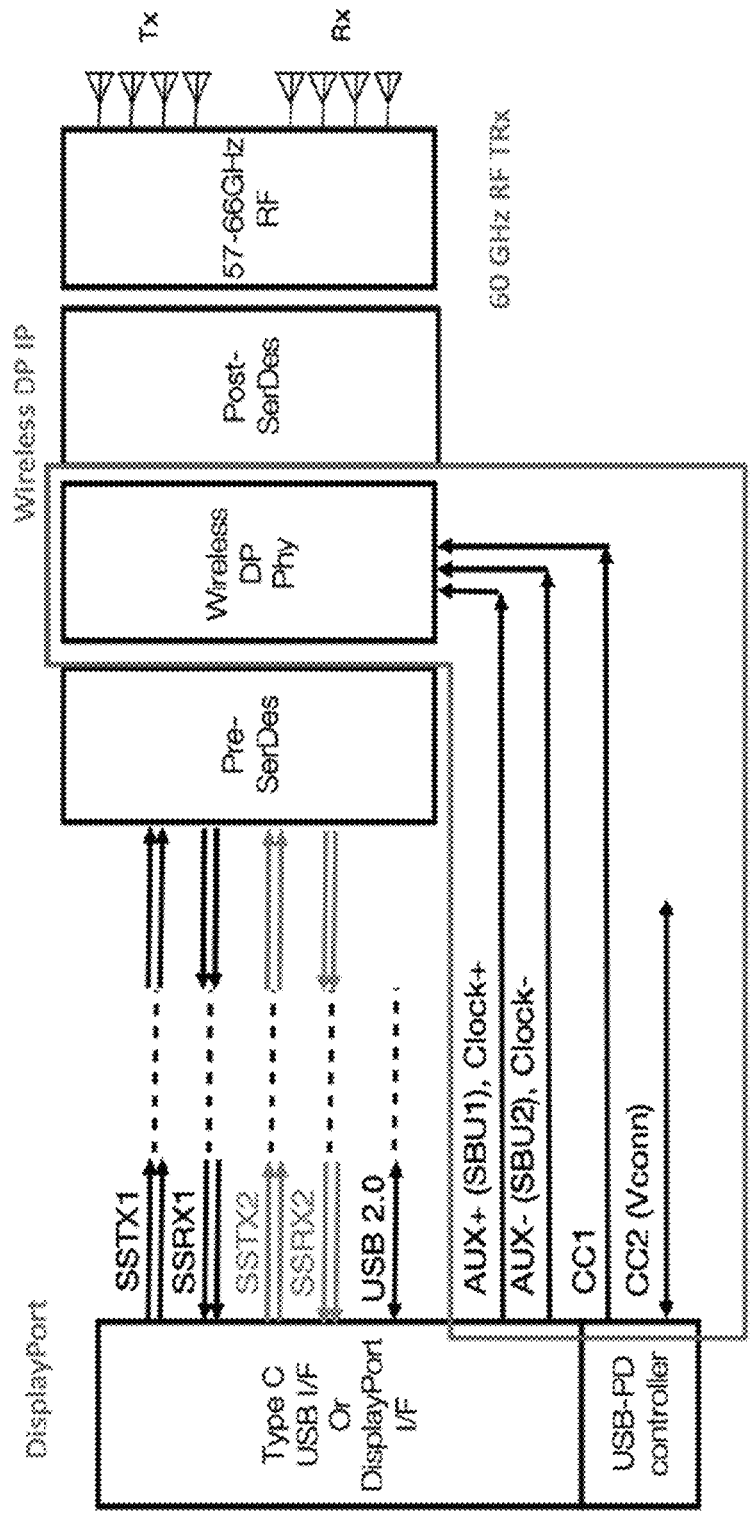
FIG. 3 is a view illustrating signal transmission in each configuration of the wireless transmission controller device.

FIG. 1 is a view illustrating a detailed configuration of a signal transmitter, FIG. 2 is a view illustrating a detailed configuration of a signal receiver, and FIG. 3 is a view illustrating signal transmission in each configuration of the wireless transmission controller device.

The wireless transmission controller device according to the exemplary embodiment of the present disclosure includes: a signal transmitter 100 connected to an image storage device 300 to receive an image signal and wirelessly transmit the image signal to a signal receiver 200 through ultra-high frequency communication; and the signal receiver 200 configured to convert the image signal transmitted wirelessly from the signal transmitter 100 and transmit the converted image signal so as to be displayed on an image display device 400.

The signal transmitter 100 serves to receive an image signal input from a DP port connected to the image storage device 300, convert the received image signal into a form of a high-speed serial signal, and transmit wirelessly the converted image signal to the signal receiver 200 by the ultra-high frequency communication. Here, the image storage device 300 is a device capable of storing a large-capacity image and transmitting the large-capacity image to a device to which a DP port connected, and may be, for example, a desktop PC, a laptop computer, a smartphone, a phablet phone, or a tablet. In addition, although it has been described that the image signal is transmitted through the DP port in the present example, the image signal may be input through an input port such as USB Type-C or Thunderbolt, which is advantageous for high-speed transmission.

The signal receiver 200 serves to receive a high-speed serial signal from the signal transmitter 100, undergo a conversion process, and transmit an image signal to the image display device 400 such as a monitor or a smartphone connected to a DP port.

In addition, the signal transmitter 100 and the signal receiver 200 may be manufactured in the form of a communication chip, to be respectively modularized and designed for the image storage device 300 and the image display device 400, or may be manufactured in the form of a dongle or a connector, which have an input/output terminal, to be respectively detachable to the image storage device 300 and image display device 400.

Referring to FIG. 1, the signal transmitter 100 further includes a first image controller 110, a first converter 120, a data composition part 130, and a wireless transmission part 140.

Figure 4:
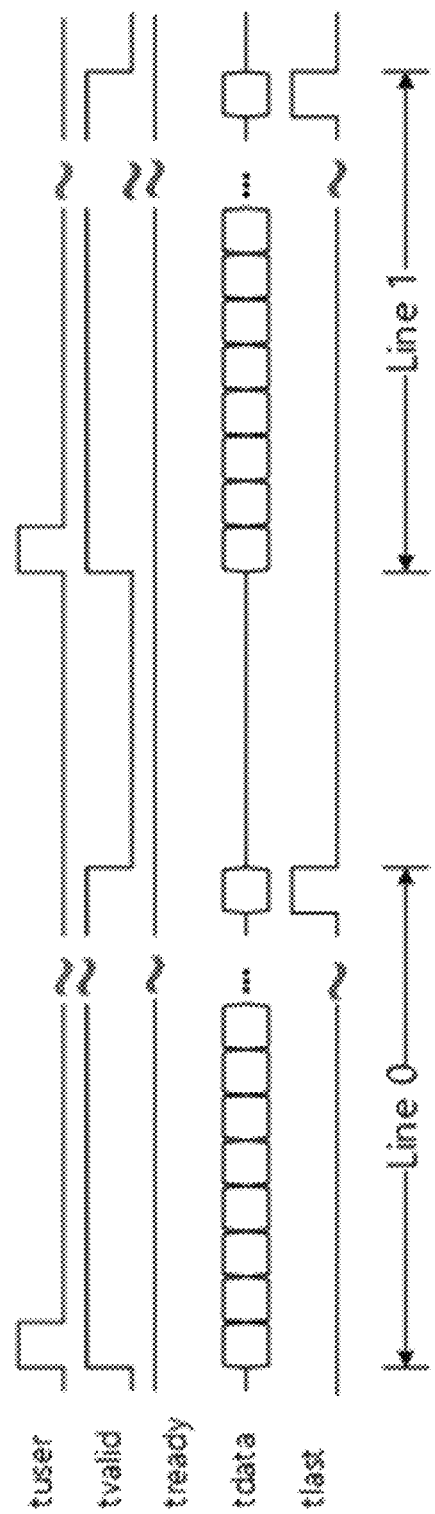
FIG. 4 is a view illustrating an example of an AXI4-Stream signal interface.

The first image controller 110 receives an image signal for each of four lines through the video storage device 300 and a DP port, and outputs a signal corresponding to each line in a stream form, for example, as shown in FIG. 4, in the form of the AXI4-Stream.

The first converter 120 is a kind of serializer, and performs a function of serializing an image signal input from the four lines in order to transmit the image signal to a single line, and may improve data processing speed through the serializing of the signal.

when an image signal is in RGB mode and bits per component (BPC) is 16 bits, pixel data of each line is composed of a data stream having a total of 48 bits of pixels, which are 16 bits of red, 16 bits of green, and 16 bits of blue, so the pixel data of the four lines is collected and converted into the data stream of 192 bits.

When an image signal is in RGB mode and bits per component is 10 bits, pixel data of each line is composed of a data stream having a total of 30 bits of pixels, which are 10 bits of red, 10 bits of green, and 10 bits of blue, so the pixel data of the four lines is collected and converted into the data stream of 120 bits.

As another example, when an image signal is in YUV422 mode and bits per component is 16 bits, pixel data of each line is composed of a data stream having a total of 32 bits of pixels, which are 16 bits of Y, and 16 bits of U/V, so the pixel data of the four lines is collected and converted into the data stream of 128 bits.

As yet another example, when an image signal is in YUV422 mode and bits per component is 10 bits, pixel data of each line is composed of a data stream having a total of 20 bits of pixels, which are 10 bits of Y, and 10 bits of U/V, so the pixel data of the four lines is collected and converted into the data stream of 80 bits.

In order to be used in the data composition part 130, the data changed as described above is stored in an internal memory together with signals of Start of Frame and End of Line.

In addition, in order to transmit the stored data to the wireless transmission part 140, the stored data is used in the data composition part 130 where the stored data is composed into a transmission frame by applying a separate transmission protocol.

The data composition part 130 performs a function of reading data stored in the first converter, composing a data frame by applying the following transmission protocol to the data, and then transmitting the data to the wireless transmission part 140.

Figure 5:
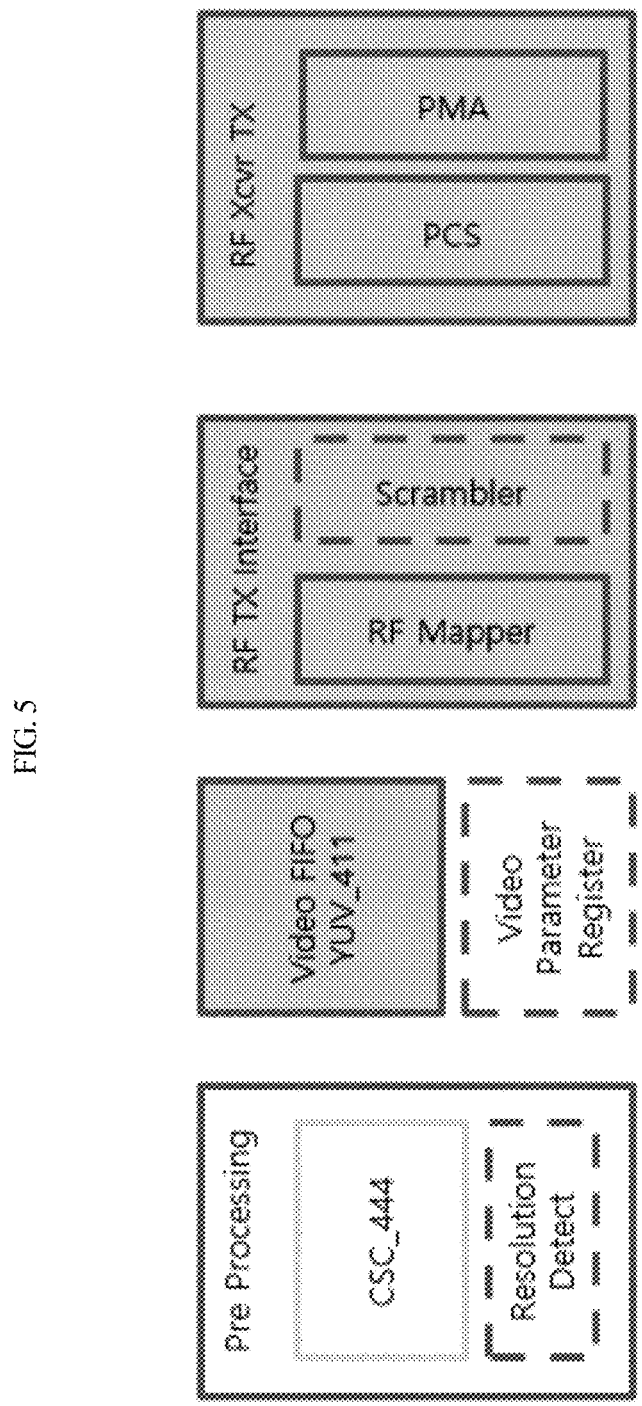
FIGS. 5 and 6 are views exemplarily illustrating detailed configurations of a data composition part and a data analysis part, respectively.

Specifically, starting with a 64-bit preamble, the data composition part 130 may compose a data frame by including Video Format, Color Depth, Pixel Per Clock, Frame Rate, Resolution, Sequence Number, Total Packet Length in Bytes, Source Stream ID, Destination StreamID, and Packet, and a structure for such composition is shown in FIG. 5.

The wireless transmission part 140 converts the stream data input from the data composition part 130 into a high-speed serial signal and composes the converted high-speed serial signal to be wirelessly transmitted to the signal receiver 200 by ultra-high frequency communication.

The wireless transmission part 140 performs a function of receiving the converted high-speed serial signal to be converted into a stream, and is configured to use a single line and have, for example, a line rate of 16.375 Gbps and a 64-bit User Data Width.

In addition, the wireless transmission part 140 may further perform a function of mixing a high-speed serial signal with a 60 GHz carrier frequency for ultra-high frequency communication in 30 to 300 GHz band, preferably in 60 GHz band. To this end, the wireless transmission part 140 may further include: an oscillator for generating an ultra-high frequency signal; a modulator for performing modulation on the basis of the generated signal; an amplifier (PA) for amplifying the modulated ultra-high frequency electromagnetic wave signal received from the modulator; and an antenna for transmitting the mixed data to the signal receiver 200. In addition, the oscillator is a voltage-controlled oscillator that generates a signal of 60 GHz band, which is an ultra-high frequency. In addition, the oscillator may prevent frequency fluctuation and be varied to a desired frequency, and in particular, may further include a phase locked loop (PLL) for 60 GHz frequency lock.

The signal receiver 200 receives data from the signal transmitter 100, and in order to transmit the data to the image display device 400 and display an image, as shown in FIG. 2, the signal receiver 200 further include: a wireless reception part 240, a data analysis part 230, a second converter 220, and a second image controller 210.

The wireless reception part 240 may be designed to have the same function as that of the wireless transmission part 140 and the same or similar detailed configuration of the wireless transmission part 140. The wireless reception part 240 receives wireless DP signal data transmitted from the wireless transmission part 140 by ultra-high frequency communication.

Figure 6:
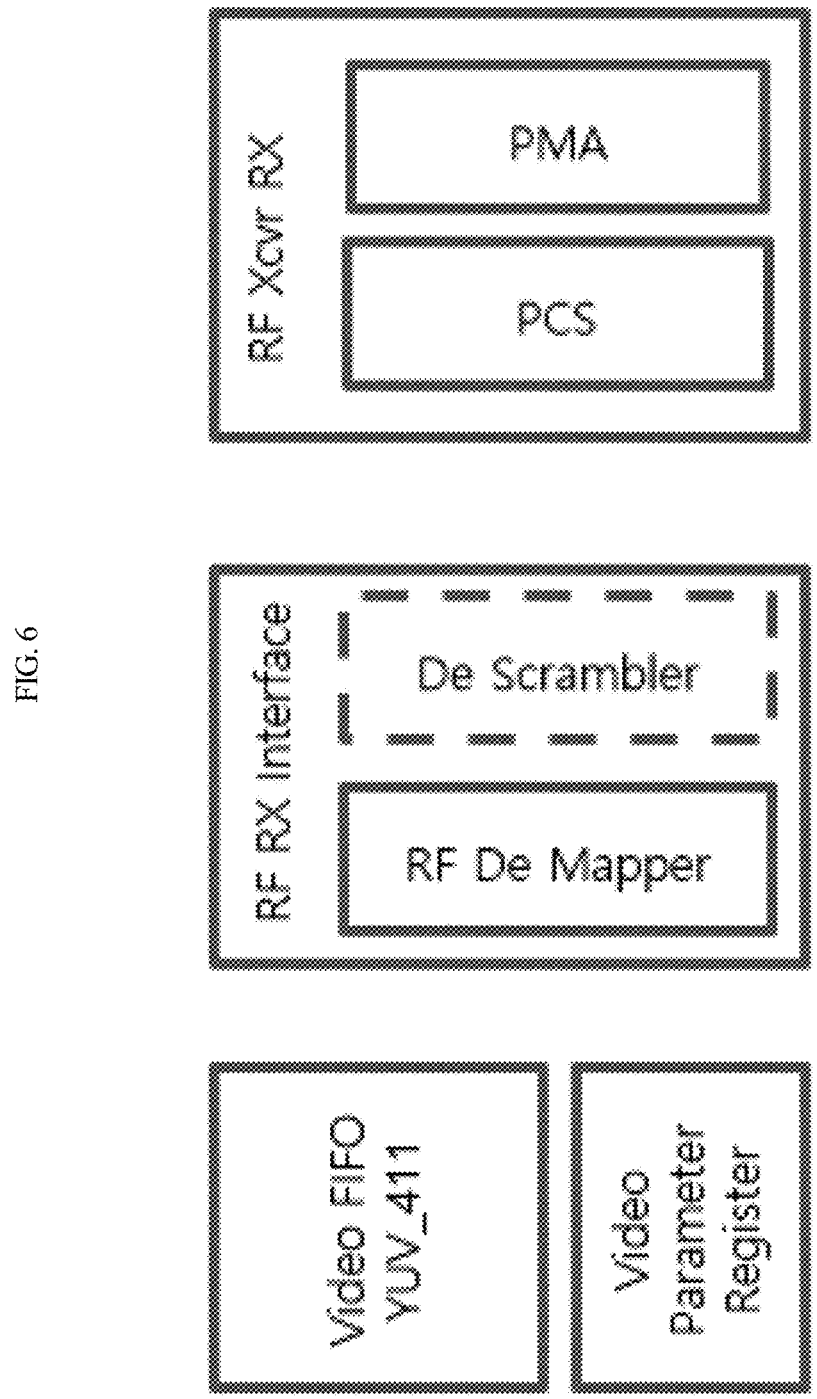

The data analysis part 230 applies the following transmission protocol to the data received from the wireless reception part 240 so as to extract an image signal. Specifically, the extracted image signal is used to perform an inverse conversion process of conversion of the data composition part 130, and is stored in a memory together with, for example, 120 bits for RGB mode, 80 bits for YUV422 mode, and signals of Start of Frame and End of Line. In addition, the data analysis part 230 may include the detailed configuration as shown in FIG. 6.

The second converter 220 is a deserializer, and performs a function of distributing data for each line in order to transmit the image signal restored by the data analysis part 230 to the second image controller 210.

Specifically, when an image signal is in RGB mode and bits per component is 16 bits, 192 bits of pixel data are changed to 48 bits of stream data for each line.

As another example, when an image signal is in RGB mode and bits per component is 10 bits, 120-bit pixel data is changed to 30-bit stream data for each line.

When an image signal is in YUV422 mode and bits per component is 16 bits, 128-bit pixel data is changed to 32-bit stream data for each line.

When an image signal is in YUV422 mode and bits per component is 10 bits, 80-bit pixel data is changed to 20-bit stream data for each line.

The changed stream data is transmitted to the second image controller 210, where an interface format makes use of the same AXI4-Stream format as the stream format of the first image controller 110 described above.

The second image controller 210 transmits the restored image signal for each of the four lines to the image display device 400 connected to the DP port, thereby displaying the image.

What is claimed is:

1. A wireless transmission controller device, the device comprising:
    a signal transmitter configured to receive an image signal input from a USB T e C or a DP port, which are connected to an image storage device, convert the received image signal into a form of a high-speed serial signal, and wirelessly transmits the converted image signal to a signal receiver by ultra-high frequency communication; and
    the signal receiver configured to receive the high-speed serial signal from the signal transmitter, undergo a conversion process, and transmit the image signal to an image display device such as a monitor or a smartphone connected to the DP port,
    wherein the signal transmitter further comprises:
    a first image controller configured to receive the image signal for each of four lines through the image storage device, and the USB T e C or the DP port, and output a signal corresponding to each line in a stream form;
    a first converter configured to serialize the image signal input from each of the four lines to a single line;
    a data composition part configured to read data stored in the first converter, compose a data frame by applying a following transmission protocol, and then transmit the data to a wireless transmission part; and
    the wireless transmission part configured to convert stream data input from the data composition part into the high-speed serial signal, and wirelessly transmit the high-speed serial signal to the signal receiver by the ultra-high frequency communication.

2. The device of claim 1, wherein the signal transmitter and the signal receiver are manufactured in a form of a communication chip to be respectively modularized and designed for the image storage device and the image display device, or are manufactured in a form of a dongle or a connector, which have an input/output terminal, to be respectively detachable to the image storage device and the image display device.

3. The device of claim 1, wherein the signal receiver comprises:
- a wireless reception part configured to receive wireless signal data transmitted from the wireless transmission part through the ultra-high frequency communication;
- a data analysis part configured to apply the transmission protocol to the data received from the wireless reception part to extract the image signal;
- a second converter configured to distribute the data for each of the four lines in order to transmit the image signal restored by the data analysis part to a second image controller; and
- the second image controller configured to transmit the restored image signal for each of the four lines to the image display device connected to the USB T e-C or the DP port, so as to display the image.

4. The device of claim 1, wherein the ultra-high frequency communication is performed by using an ultra-high frequency in a band of 30 to 300 GHz.

5. The device of claim 2, wherein the ultra-high frequency communication is performed by using an ultra-high frequency in a band of 30 to 300 GHz.

6. The device of claim 3, wherein the ultra-high frequency communication is performed by using an ultra-high frequency in a band of 30 to 300 GHz.

\* \* \* \* \*